(12) United States Patent
Mancini et al.

(10) Patent No.: US 11,118,478 B2
(45) Date of Patent: Sep. 14, 2021

(54) LIMITER WITH INTEGRATED FASTENER RETENTION FOR AN ENGINE ASSEMBLY COMPONENT

(71) Applicant: Ford Global Technologies, LLC, Dearborn, MI (US)

(72) Inventors: JonCarlo Mancini, Livonia, MI (US); Richard Anton, Northville, MI (US); Mark Murphy, South Lyon, MI (US); Ryan Scott Gray, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 16/176,837

(22) Filed: Oct. 31, 2018

(65) Prior Publication Data
US 2020/0131937 A1    Apr. 30, 2020

(51) Int. Cl.
| | |
|---|---|
| *F16B 43/02* | (2006.01) |
| *F01D 25/24* | (2006.01) |
| *F02B 77/02* | (2006.01) |
| *F02F 7/00* | (2006.01) |
| *F16M 1/026* | (2006.01) |

(52) U.S. Cl.
CPC ............ *F01D 25/243* (2013.01); *F02B 77/02* (2013.01); *F02F 7/0082* (2013.01); *F16M 1/026* (2013.01)

(58) Field of Classification Search
CPC ...... F01D 25/243; F02B 77/02; F02F 7/0082; F16M 1/026

USPC ......................................................... 411/546
See application file for complete search history.

(56) References Cited

U.S. PATENT DOCUMENTS

| | | | |
|---|---|---|---|
| 3,967,875 A | 7/1976 | Stanaitis | |
| 4,732,519 A | 3/1988 | Wagner | |
| 5,255,647 A * | 10/1993 | Kiczek | F02F 7/006 123/195 C |
| 5,382,124 A | 1/1995 | Frattarola | |
| 6,059,503 A * | 5/2000 | Johnson | F16B 41/002 411/353 |
| 6,225,566 B1 * | 5/2001 | Dienst | H01B 17/56 174/138 D |
| 6,227,784 B1 * | 5/2001 | Antoine | F02B 77/00 411/11 |
| 6,457,925 B1 | 10/2002 | Genick, II | |
| 6,860,686 B2 * | 3/2005 | Schneider | F16B 33/004 403/297 |
| 7,114,901 B2 * | 10/2006 | Maruyama | F16B 5/0208 411/353 |
| 7,708,512 B2 * | 5/2010 | McLean | F16B 5/025 411/533 |
| 7,753,633 B2 * | 7/2010 | Genick, II | F16B 35/048 411/542 |

(Continued)

*Primary Examiner* — Gary W Estremsky
(74) *Attorney, Agent, or Firm* — Geoffrey Brumbaugh; McCoy Russell LLP

(57) ABSTRACT

Methods and systems are provided for an engine component assembly having one or more fastener retention apparatuses. In one example, a system may include each of the one or more fastener retention apparatuses including a rigid limiter and an integrated fastener retention feature adhered to an inner surface of an interior passage of the rigid limiter. Further, one or more fasteners may be held captive by each of the one or more fastener retention apparatuses capturing one fastener of the one or more fasteners.

18 Claims, 5 Drawing Sheets

(56) References Cited

U.S. PATENT DOCUMENTS

| | | | | |
|---|---|---|---|---|
| 7,946,781 | B2* | 5/2011 | Mudel | F16B 41/002 |
| | | | | 403/16 |
| 8,202,033 | B2* | 6/2012 | Choi | B62D 25/147 |
| | | | | 411/546 |
| 9,303,679 | B2* | 4/2016 | Dechant | F16B 41/002 |
| 9,689,417 | B2 | 6/2017 | Stewart | |
| 2002/0009350 | A1* | 1/2002 | Radtke | F16B 41/002 |
| | | | | 411/353 |
| 2013/0330145 | A1 | 12/2013 | Cloud | |
| 2015/0267609 | A1 | 9/2015 | Lohr et al. | |
| 2016/0069364 | A1 | 3/2016 | Montague et al. | |

\* cited by examiner

LIMITER WITH INTEGRATED FASTENER RETENTION FOR AN ENGINE ASSEMBLY COMPONENT

FIELD

The present description relates generally to assembly of an engine component. More particularly, the present description relates to limiters having an integrated fastener retention apparatus for receiving a fastener for assembling an engine component.

BACKGROUND/SUMMARY

In the complex, multistep production of motor vehicles, there continually exists room for improvement in the optimization of assembly component design with the goal of maximizing the efficiency of the assembly process. This is not limited to an assembly of the final product alone, but extends to assembly of component pieces. These component pieces may be more specialized to motor vehicle assembly, or they may be of a more generic nature, such as washers, grommets, or fasteners for fixing component pieces to one another. Some of this latter category of components may be of a significantly smaller size scale than those components integral to the operation of (or specific to the design of) the motor vehicle, such as the engine block or engine cover.

Methods of assembly have included specialized parts being assembled in a first location (or multiple, different first locations for each part) and these parts being shipped, not fastened to one another, to a second location, where they may be fastened to one another with common fastening components. Many of the specialized parts further have multiple locations (e.g., apertures) for the placement and tightening of fasteners, increasing the total number of fasteners required for a complete assembly of the component of the motor vehicle. This increases the likelihood of dropping and/or misplacing a fastener during the course of assembly and/or shipping, decreasing production speed and efficiency. Further, the precision and rigidity of the fits of some fasteners may lead to resistance of a fastener to being received within and fastened to a mating part, which can further delay production or result in warped components.

To overcome some of these problems, assembly components have been developed with integrated fastener retention devices. Such devices are designed to hold captive a fastener inserted at a first assembly location, whereby the fasteners may be prevented from being easily removed. When a final assembly of the motor vehicle takes place at another assembly location, the captive fasteners may then be utilized to fasten components to one another without fear of losing said fasteners.

The inventors herein have recognized shortcomings in the above approach. As one example, such fastener retention devices may be rigid and of the same shape, thereby limiting flexibility and tolerances when fastening components to one another during assembly. More specifically, if fasteners have even small variability in their shape/size and/or apertures of the part to be fastened to (receiving the fasteners in the fastener retention devices) are offset due to machining tolerances, the mating parts may be difficult to assemble and/or assembly of the mating parts may result in a warped assembly.

Accordingly, the inventors herein provide a system to at least partly address the above issues. In one example, the issues described above may be addressed by a fastener retention apparatus including a rigid limiter including an interior passage formed between a wider, head end and narrower, tail end and an integrated fastener retention feature permanently fixed to an inner surface of the interior passage at the head end, the fastener retention feature comprising a compressible material, the fastener retention apparatus shaped to receive a fastener within the interior passage and through the fastener retention feature. In one example, the integrated fastener retention feature may be chemically adhered to the rigid limiter. A fastener may be placed within the interior passage of the rigid limiter and through the fastener retention feature such that said fastener is held captive via the integrated fastener retention feature. By having the integrated fastener retention feature comprised of a compressible material, the captive fastener may have limited (e.g., a small amount of) radial and/or axial play within the fastener retention apparatus. In some examples, the rigid limiter may be one of a plurality of rigid limiters, which may further be integrated within a motor vehicle assembly component. In this way, an assembly process of a motor vehicle may be made more efficient by reducing the total number of individual and separate components required for assembly and by reducing resistance in the fastening of each captive fastener present in a given component. Further, the above-described fastener retention apparatus allows for some flexibility in movement of the fastener within the fastener retention apparatus for ease of assembly, while at the same time holding the fastener within the fastener retention apparatus, thereby reducing the chance of losing the fastener during a shipping process, prior to motor vehicle assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
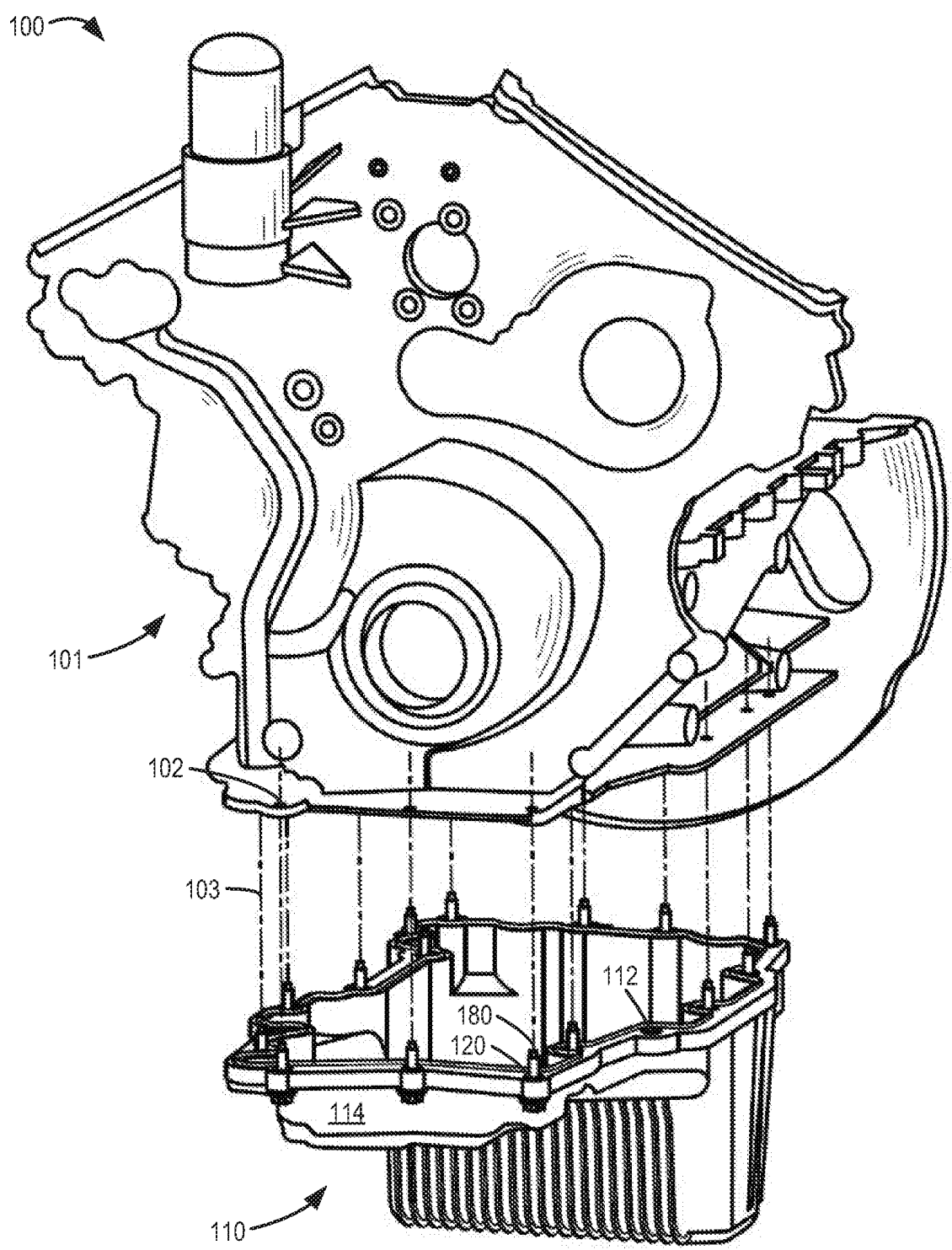
FIG. 1 shows a perspective view of an example engine assembly for a vehicle engine.
Figure 2:
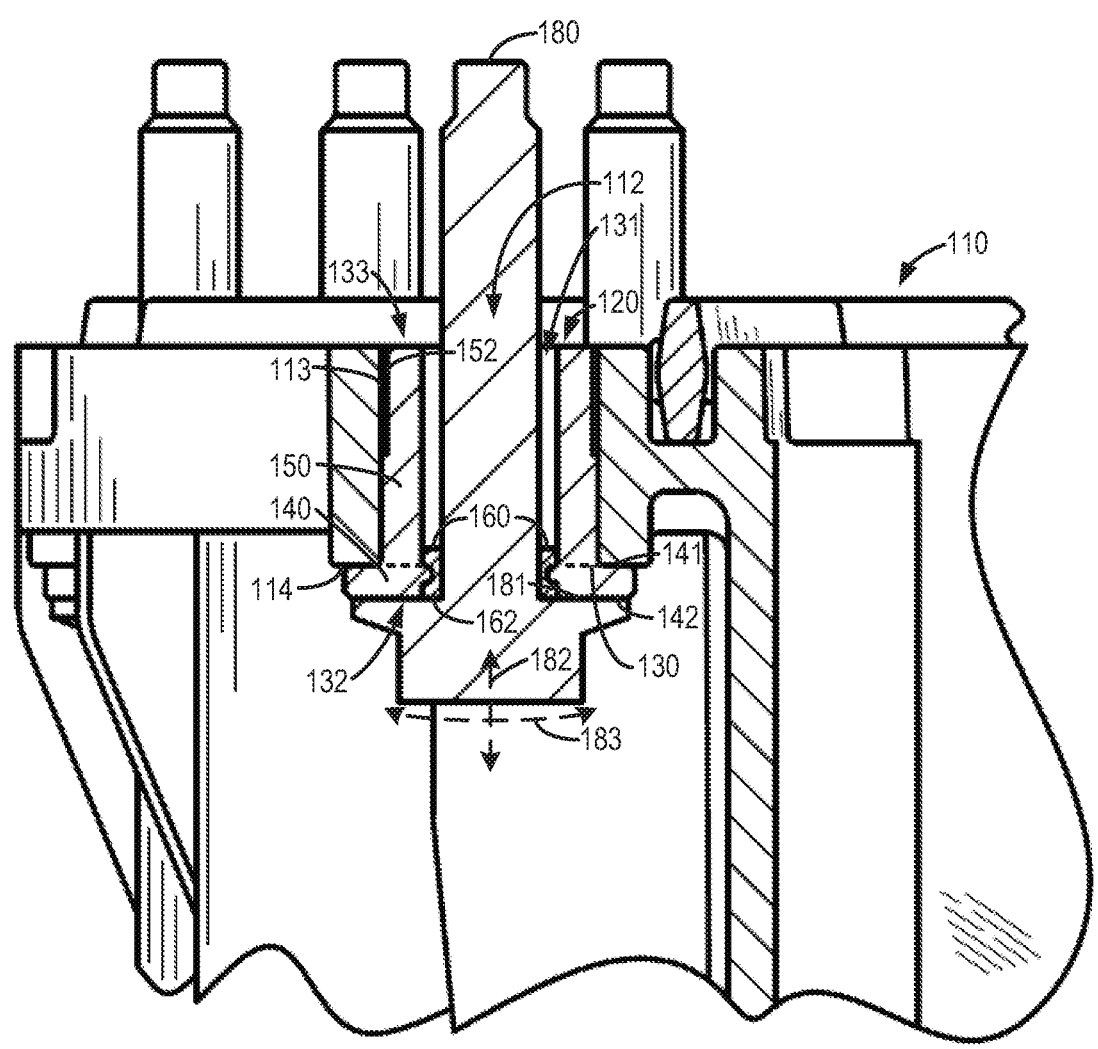
FIG. 2 shows a sectional view of an example fastener retention apparatus holding a captive fastener, the fastener retention apparatus being integrated in an engine oil pan for a vehicle engine.

The following description relates to systems and methods for a fastener retention apparatus. In one example, the fastener retention apparatus is one of a plurality of fastener retention apparatuses included in an engine assembly component, as shown in FIGS. 1 and 2. More specifically, the engine assembly component may be an engine oil pan adapted to be fastened to an engine (e.g., cylinder) block.

Further, each of the plurality of fastener retention apparatuses may have an integrated fastener retention feature. Each integrated fastener retention feature may hold a fastener captive.

Figure 3:
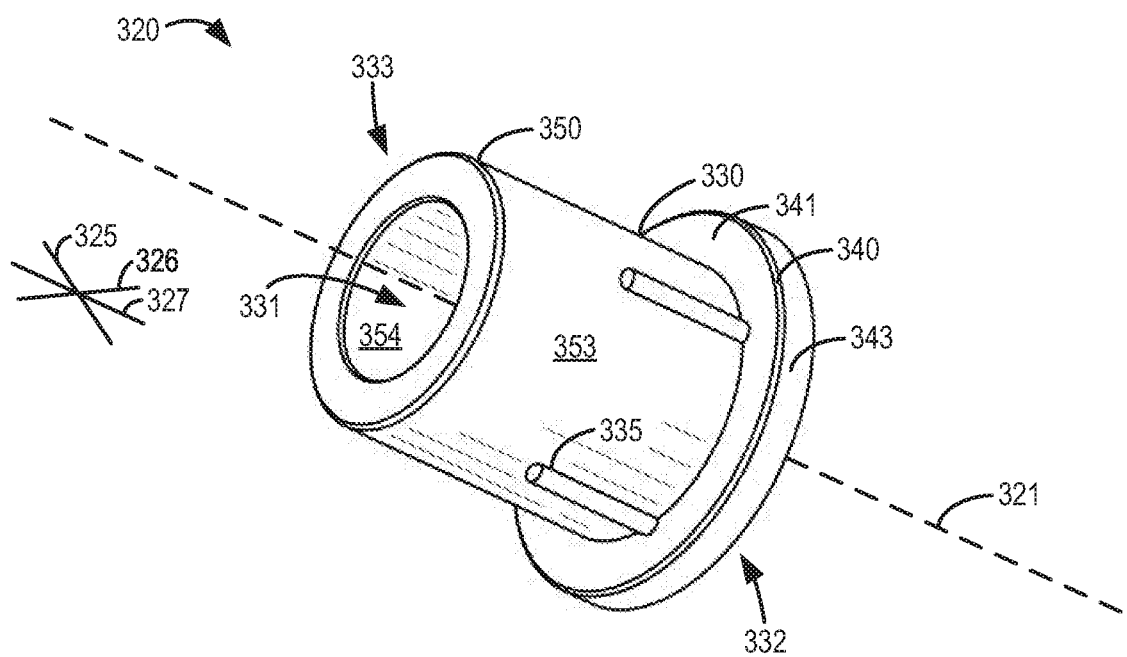
FIG. 3 shows a perspective view of a fastener retention apparatus.
Figure 4:
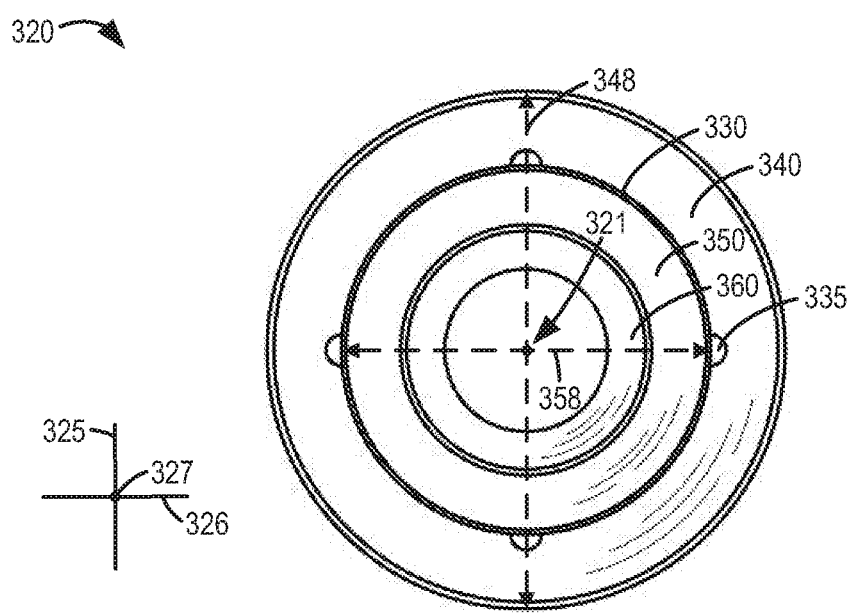
FIG. 4 shows a bottom view of a fastener retention apparatus.
Figure 5:
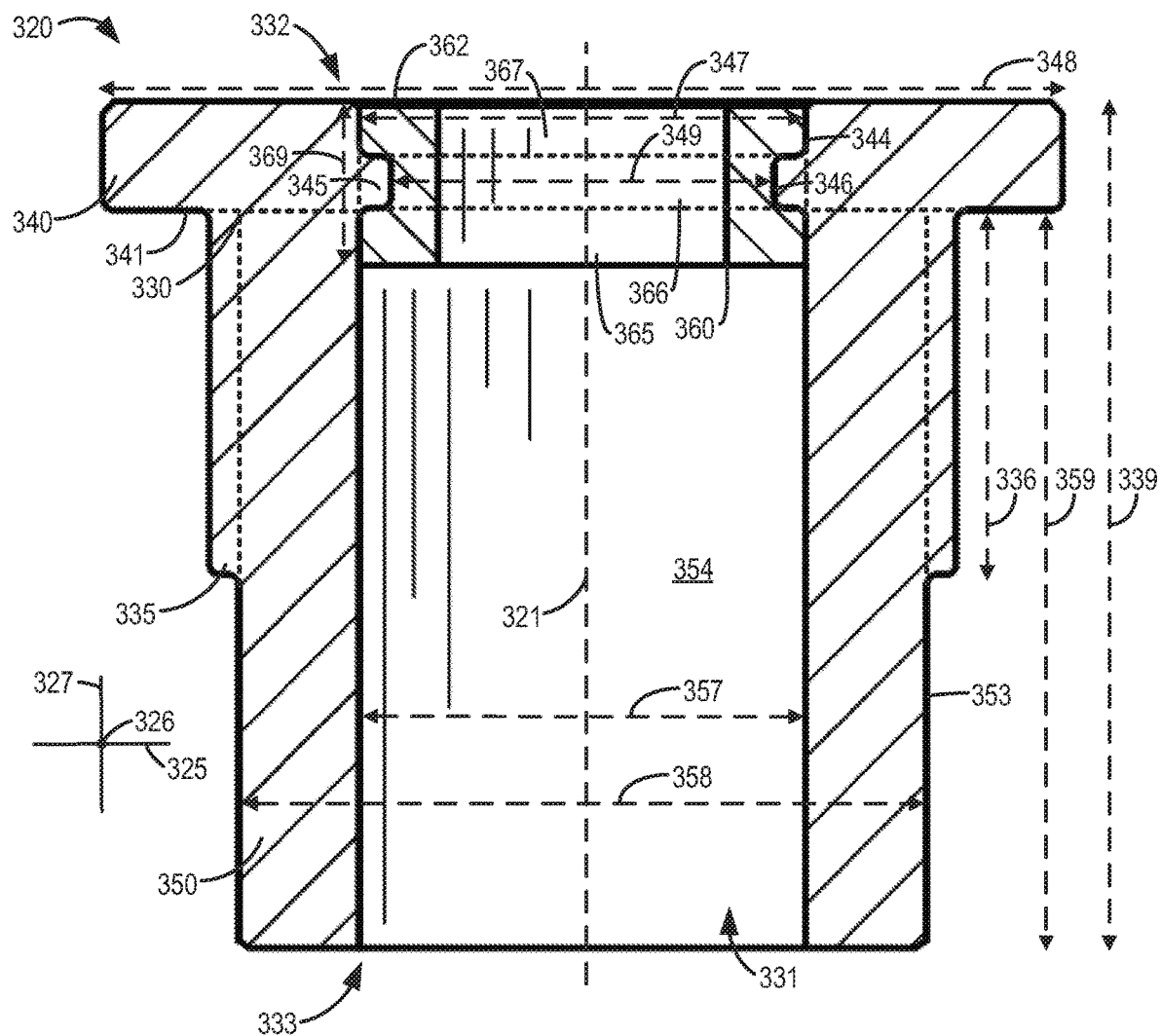
FIG. 5 shows a cross-sectional view of a fastener retention apparatus.

FIGS. 3-5 show perspective, bottom, and cross-sectional views of a fastener retention apparatus, respectively. In one example, the fastener retention apparatus may comprise a rigid limiter. Further, the fastener retention apparatus may have an integrated fastener retention feature integrated within an inner surface of the rigid limiter, the integrated fastener retention feature being visible in at least the bottom and sectional views of the fastener retention apparatus (FIGS. 4 and 5, respectively).

Figure 6:
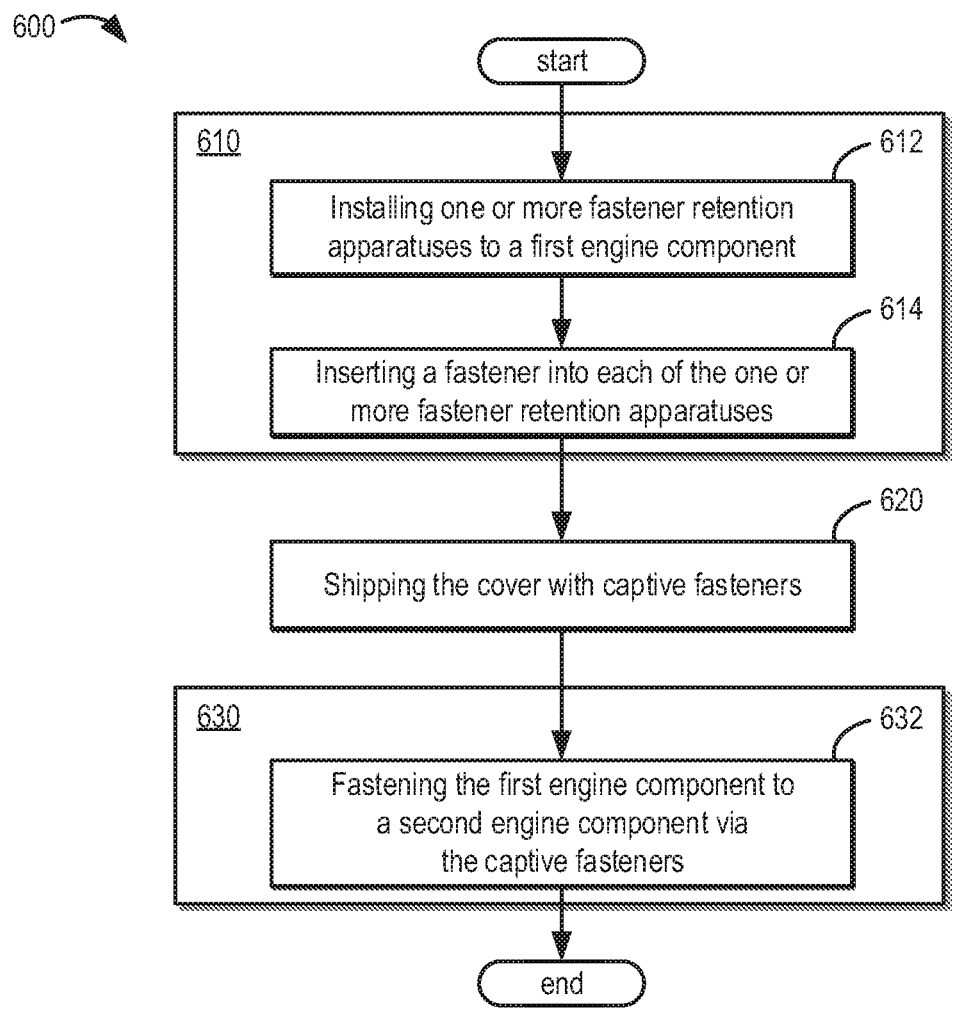
FIG. 6 shows a flow chart for an example method of production, assembly, and placement of an engine component of an engine assembly.

A production method is shown in FIG. 6. In one example, the production method may include an assembly of an engine component of an engine assembly at a first assembly location. Following assembly, the engine component of the engine assembly may include one or more fastener retention apparatuses, each fastener retention apparatus holding a fastener captive. The engine component of the engine assembly may then be shipped to a second assembly location, where the engine component of the engine assembly may be fastened to a second engine component of the engine assembly.

It should be appreciated that in the following description a particular arrangement, configuration, and/or selection of engine assembly components is/are only illustrative and that alternative arrangements, configurations, and/or selections of the engine assembly components may be adopted without deviating from the underlying inventive concept as disclosed. Additionally, the fastener retention apparatus described herein may be used for assembly of alternate components in an assembly, other than an engine component (e.g., outside the automotive industry or for alternate assembly parts of a vehicle).

Referring now to FIG. 1, an engine assembly 100 is shown, the engine assembly 100 comprising at least an engine block 101 and an engine oil pan 110. A plurality of receiving apertures 102 are located in the engine block 101 for receiving one or more captive fasteners 180. A plurality of apertures 112 are located in a surface 114 of the engine oil pan 110. As shown in FIG. 1, engine oil pan 110 includes the plurality of apertures 112 positioned in surface 114, around a perimeter of engine oil pan 110. Each of the plurality of apertures 112 are spaced apart from one another along the surface 114. A plurality of fastener retention apparatuses 120 are shown, where each of the fastener retention apparatuses 120 may be identical to one another and positioned within a corresponding aperture 112 of the apertures 112. In this way, each fastener retention apparatus 120 is affixed to the engine oil pan 110 via one of the apertures 112. As shown in FIG. 1, each fastener retention apparatus 120 holds a captive fastener 180, the captive fastener 180 being captured by a fastener retention feature of the fastener retention apparatus 120, as shown in FIG. 2, described further below. Guidelines 103 are shown, directing placements of the captive fasteners 180 into the corresponding receiving apertures 102. In some examples, the captive fasteners 180 may have external threads. Further, the receiving apertures 102 may have internal threads, such that the internal threads of the receiving apertures 102 may match and fit to the external threads of the captive fasteners 180 upon threading.

The fastener retention apparatus 120 holding a captive fastener 180 may reinforce an integrity of the surface 114 upon fastening of the engine oil pan 110 to the engine block 101 by reducing warping and/or deformation of the surface 114. In some examples, the integrity of the surface 114 may be reinforced by an increase in radial and/or axial play to the captive fastener 180 afforded by a composition of the fastener retention feature. More specifically, the fastener retention feature may be composed of a compressible material, wherein the compressible material may have a modulus of elasticity in a range of 0.01 to 0.7. In such examples, the fastener retention feature may provide limited (e.g., a small amount of) radial and/or axial movement to the captive fastener 180 held within the fastener retention feature. As a result, components having multiple fastening locations (apertures, fasteners, and fastener retention features) for fastening the two components to one another may be fastened to one another with reduced warping and/or deformation of the components due to the ability of the fasteners to move slightly within the corresponding fastener retention features to align with a corresponding aperture. In additional or alternative examples, the fastener retention apparatus 120 may comprise a compression limiter and/or a load limiter, wherein the limiter may further reinforce the surface 114 of the engine oil pan 110 from warping and/or deformation under stress of a compressive load. Additionally or alternatively, a plurality of captive fasteners 180 being held by the plurality of fastener retention apparatuses 120 may distribute the compressive load across multiple sites, thereby further reinforcing the integrity of engine components.

Referring now to FIG. 2, a sectional view of the engine oil pan 110 of FIG. 1 is shown. Specifically, FIG. 2 shows a fastener retention apparatus 120 positioned within and affixed to an aperture 112 within the engine oil pan 110. The fastener retention apparatus 120 comprises a rigid limiter 130 positioned within the aperture 112 such that an outer surface 152 of the rigid limiter 130 has face-sharing contact with an inner surface 113 of the aperture 112. The rigid limiter 130 additionally includes inner surfaces forming an interior passage 131. The fastener retention apparatus 120 may further comprise a fastener retention feature 160 integrated within the rigid limiter 130. For example, the retention feature 160 is integrated with and permanently fixed to inner surfaces of the interior passage 131 of the rigid limiter 130, at a head end 132 of the rigid limiter 130. As shown in FIG. 2, a fastener 180 is inserted through first interior passage 131 of the rigid limiter 130 and second interior passage of the fastener retention feature 160 where second interior passage runs through a center of the fastener retention feature 160 which is annular. The fastener retention feature 160 holds the fastener 180 in place within the fastener retention apparatus 120, and in engine oil pan 110, such that the fastener 180 may not be easily removed (e.g., during transport, prior to assembly, etc.). For example, an inner diameter of the fastener retention feature 160 may be about the same size as an outer diameter of the captive fastener 180.

The rigid limiter 130 includes a body 150 and a flange 140, the body 150 extending from a tail end 133 of the rigid limiter 130 to the flange 140 and the flange 140 extending from the body 150 to the head end 132 of the rigid limiter 130. An outer surface 152 of the body 150 is in face-sharing contact with the inner surface 113 of the aperture 112. An inward-facing surface 141 of the flange 140, is closer to the tail end 133 than the head end 132, is in face-sharing contact with a surface 114 of the engine oil pan 110. An outward-facing surface 142 of the flange 140, which is arranged opposite the inward-facing surface 141 of the flange 140 and closer to the head end 132 than the tail end 133, is in face-sharing contact with a surface 181 of the captive fastener 180. Further, the flange 140 may mitigate warping and/or deformation of the engine oil pan 110 by distributing a compressive load of the captive fastener 180 across the outward-facing surface 142 of the flange 140.

In some examples, the fastener retention feature 160 may be chemically adhered and/or bonded to inner surfaces of the interior passage 131 of the rigid limiter 130. Further, the fastener retention feature 160 may be composed of a compressible material (as described above in reference to FIG. 1), the compressible material providing limited (e.g., a small amount of) radial and/or axial movement to the captive fastener 180 held within the fastener retention feature 160 relative to the rigid limiter 130. For example, via compression of the compressible material of the fastener retention feature 160, the fastener may move a limited amount in a radial direction 183 and/or an axial direction 182, relative to the fastener retention apparatus 120. In some examples, a limited movement in the radial direction 183 may be a tilt of up to 10 degrees. In additional or alternative examples, a limited movement in the axial direction 182 may be a displacement of a depth of external threading on the captive fastener 180 (e.g., up to 3 mm).

The fastener retention feature 160 may be proximate to the head end 132 of the rigid limiter 130 such that the fastener retention feature 160 may be closer to the head end 132 of the rigid limiter 130 than to the tail end 133 of the rigid limiter 130. The fastener retention feature 160 may extend from the head end 132 to within the interior passage 131 of the rigid limiter 130. Therein, the fastener retention feature 160 may extend no further than a near portion of the body 150 being arranged adjacent to the flange 140, the near portion of the body 150 being closer to the flange 140 than to the tail end 133. The fastener retention feature 160 may be therefore arranged on and/or around a portion of the flange 140. In some examples, the outward-facing surface 142 of the flange 140 may coincide with the head end 132, such that an outward-facing surface 162 of the fastener retention feature 160 may be flush and/or continuous with the outward-facing surface 142 of the flange 140.

FIGS. 3-5 show different views of a fastener retention apparatus 320 adapted to fit within an aperture of a first component of an assembly and shaped to receive a fastener used to fasten the first component to a second component of the assembly. In one embodiment, the fastener retention apparatus 320 may be similar to the fastener retention apparatus 120 shown in FIGS. 1 and 2 and used in assembly of engine components. In alternate embodiments, the fastener retention apparatus 320 may be used for holding fasteners and assembly of components in alternate industries (e.g., outside the automotive industry) and/or for alternate assembly parts in a vehicle. FIG. 3 shows a perspective view of the fastener retention apparatus 320, FIG. 4 shows a bottom view of the fastener retention apparatus 320, and FIG. 5 shows a cross-sectional view of the fastener retention apparatus 320. Each of FIGS. 3-5 show references axes including an x-axis 325, y-axis 326, and z-axis 327. Thick, arrowless dashed lines as depicted in FIG. 5 indicate deviations and/or demarcations between separate regions of elements and/or components for ease of differentiation (such as differentiating between flange 340 and body 350, for example).

The fastener retention apparatus 320 includes a rigid limiter 330 and a fastener retention feature 360 (fastener retention feature 360 not visible in FIG. 3, but shown in FIGS. 4 and 5) inside and integrated with the rigid limiter 330. The rigid limiter 330 includes a body 350 and a flange 340, the body 350 extending from a tail end 333 of the rigid limiter 330 to an inward-facing surface 341 of the flange 340 and the flange 340 extending from the body 350 to a head end 332 of the rigid limiter 330, the head end 332 being wider than the tail end 333. As shown in FIG. 5, the head end 332 and flange 340 have a first outer diameter 348 and the tail end 333 and body 350 have a second outer diameter 358, the first outer diameter 348 larger than the second outer diameter 358.

The body 350 includes a plurality of ridges 335 extending outward (in a direction perpendicular to the central axis 321) from an outer surface 353 of the body 350. The ridges 335 are spaced apart from one another, in a direction of a circumference of the body 350, on the outer surface 353 of the body 350, each of the ridges 335 being identical. However, in alternate embodiments, each of the ridges 335 may not be identical to one another. The body 350 is cylindrical and annular, circumnavigating a central axis 321 of the fastener retention apparatus 320, such that an inner surface 354 of the body 350 may form at least a portion of an interior passage 331 of the rigid limiter 330. Additionally, the flange 340 is cylindrical and annular, circumnavigating the central axis 321 of the fastener retention apparatus 320, such that inner surfaces 344 and 346 (as shown in FIG. 5) of the flange 340 may form at least a portion of the interior passage 331 of the rigid limiter 330.

An inner diameter 357 (as shown in FIG. 5) of the body 350 extends from a first location on the inner surface 354 of the body 350 through the central axis 321 of the fastener retention apparatus 320 to a second location on the inner surface 354 of the body 350 being opposite and across from the first location on the inner surface 354 of the body 350. Further, an outer diameter 358 of the body 350 extends from a first location on the outer surface 353 of the body 350 through the central axis 321 of the fastener retention apparatus 320 to a second location on the outer surface 353 of the body 350 being opposite and across from the first location on the outer surface 353 of the body 350. Thus, the outer diameter 358 of the body 350 is larger than the inner diameter 357 of the body 350.

The flange 340 extends outward from the outer surface 353 of the body 350 to an outer surface 343 of the flange 340, around an entire outer circumference of the body 350, wherein the outer circumference may be a circumference of a circle defined by the outer diameter 358 of the body 350. An outer diameter 348 of the flange 340 extends from a first location on the outer surface 343 of the flange 340 through the central axis 321 of the fastener retention apparatus 320 to a second location on the outer surface 343 of the flange 340 being opposite and across from the first location on the outer surface 343 of the flange 340. Thus, the outer diameter 348 of the flange 340 is larger than the outer diameter 358 of the body 350.

As shown in FIGS. 3-5, the plurality of ridges 335 are located on the outer surface 353 of the body 350 such that each of the ridges 335 are evenly spaced from one another around the outer circumference of the body 350. However, in alternate embodiments, the ridges 335 may not be evenly spaced around the outer circumference of the body 350. As shown in FIG. 4, there are a total of four evenly spaced ridges 335. However, in alternate embodiments, the rigid limiter 330 may include more or less than four ridges 335 (e.g., two, three, five, six, or eight ridges). Each of the ridges 335 has a thickness and a distance between two adjacent ridges 335 along the outer circumference of the body 350 may be at least five times the thickness. As shown in FIGS. 3 and 5, each of the ridges 335 extends from the inward-facing surface 341 of the flange 340 along only a portion of a length 359 of the body 350 toward the tail end 333 of the rigid limiter 330, the length 359 of the body 350 being parallel to the central axis 321 of the fastener retention apparatus 320. For example, as shown in FIG. 5, a length 336 of each ridge 335 is shorter than the length 359 of the body 350. Additionally, as shown in FIGS. 3-5, the ridges 335 extend outward from the outer surface 353 of the body 350 a smaller amount than the flange 340.

As shown in FIGS. 4 and 5, the fastener retention feature 360 is arranged within the interior passage 331 of the rigid limiter 330, proximate to the head end 332. In one embodiment, the fastener retention feature 360 is permanently fixed to inner surfaces (e.g., one or more of inner surfaces 344, 346, and/or 354) of the rigid limiter 330. In some examples, the fastener retention feature 360 may be chemically adhered and/or bonded to the inner surfaces of the rigid limiter 330. In one embodiment, the fastener retention feature 360 is composed of a compressible material, wherein the compressible material may have a modulus of elasticity in a range of 0.01 to 0.7. In such examples, the fastener retention feature 360 being composed of the compressible material may provide limited (e.g., a small amount of) radial and/or axial movement relative to the rigid limiter 330 to a fastener being firmly held in the interior passage of the fastener retention feature 360 via compression of the compressible material. As described further below, the fastener retention feature 360 is shaped such that a fastener will be firmly held in an interior passage of the fastener retention feature 360, wherein said fastener may not be easily removed from the fastener retention feature 360. For example, an inner diameter of the fastener retention feature 360 may be about the same size as an outer diameter of the fastener.

As shown in FIG. 5, the flange 340 may have a stepped portion 345 projecting inwardly towards a central axis 321 of the fastener retention apparatus 320. The stepped portion 345 may extend inward from an inner surface 344 of the flange 340 to an inner surface 346 of the stepped portion 345. The stepped portion 345 may be cylindrical and annular, circumnavigating the central axis 321 of the fastener retention apparatus 320. An inner diameter 349 of the stepped portion 345 may extend from a first location on the inner surface 346 of the stepped portion 345 through the central axis 321 of the fastener retention apparatus 320 to a second location on the inner surface 346 of the stepped portion 345 being opposite and across from the first location on the inner surface 346 of the stepped portion 345.

An inner diameter 347 of the flange 340 may extend from a first location on the inner surface 344 of the flange 340 through the central axis 321 of the fastener retention apparatus 320 to a second location on the inner surface 344 of the flange 340 being opposite and across from the first location on the inner surface 344 of the flange 340. Thus, the inner diameter 347 of the flange 340 may be equal to the inner diameter 357 of the body 350. Further, the inner diameter 347 of the flange 340 may be larger than the inner diameter 349 of the stepped portion 345.

The fastener retention feature 360 may extend inside of the rigid limiter 330, an outward-facing surface 362 of the fastener retention feature 360 being located at the head end 332 of the rigid limiter 330 such that no portion of the fastener retention feature 360 projects outward from the rigid limiter 330. A length 369 of the fastener retention feature 360 may be parallel to the central axis 321 of the fastener retention apparatus 320, wherein the length of the fastener retention feature 360 may extend from the head end 332 of the rigid limiter 330 to a near portion of the body 350 being arranged adjacent to the flange 340, the near portion of the body 350 being closer to the flange 340 than to the tail end 333 of the rigid limiter 330. Further, a length 339 of the rigid limiter 330 may be parallel to the central axis 321 of the fastener retention apparatus 320, wherein the length 339 may extend from the head end 332 to the tail end 333. Thus, the length 369 of the fastener retention feature 360 may be smaller than the length 339 of the rigid limiter 330. In some examples, the length 369 of the fastener retention feature 360 may be at least four times smaller than the length 339 of the rigid limiter 330.

The fastener retention feature 360 may have a central depressed portion 365, the central depressed portion 365 extending in a direction perpendicular to the length 369 of the fastener retention feature 360 from a first location on the inner surface 346 of the stepped portion 345 to a second location on the inner surface 346 of the stepped portion 345 being opposite and across from the first location on the inner surface 346 of the stepped portion 345. Further, the central depressed portion 365 may be in face-sharing contact with the inner surface 346 of the stepped portion 345. Thus, an outer diameter of the central depressed portion 365 may be about equal to the inner diameter 349 of the stepped portion 345.

The fastener retention feature 360 may have an upper wide portion 366 and a lower wide portion 367, the upper wide portion 366 extending in a direction perpendicular to the length 369 of the fastener retention feature 360 from a first location on the inner surface 346 of the stepped portion 345 a second location on the inner surface 344 of the flange 340 being opposite and across from the first location on the inner surface 344 of the flange 340 and the lower wide portion 367 extending in a direction perpendicular to the length 369 of the fastener retention feature 360 from a first location on the inner surface 354 of the body 350 to a second location on the inner surface 354 of the body 350 being opposite and across from the first location on the inner surface 354 of the body 350. Further, the upper wide portion 366 may be in face-sharing contact with the inner surface 344 of the flange 340 and the lower wide portion 366 may be in face-sharing contact with the inner surface 354 of the body 350. Thus, an outer diameter of the upper wide portion 366 may be equal to the inner diameter 347 of the flange 340 and an outer diameter of the lower wide portion 367 may be equal to the inner diameter 357 of the body 350.

An inner diameter of the fastener retention feature 360 may extend from a first location on the inner surface of the fastener retention feature 360 through the central axis 321 of the fastener retention apparatus 320 to a second location on the inner surface of the fastener retention feature 360 being opposite and across from the first location on the inner surface of the fastener retention feature 360. Thus the inner diameter of the fastener retention feature 360 may be smaller than each of the inner diameter 357 of the body 350, the inner diameter 347 of the flange 340, and the inner diameter 349 of the stepped portion 345.

Each of the upper wide portion 366 and the lower wide portion 367 may be on either side of the central depressed portion 365 along the length 369 of the fastener retention feature 360. Thus inner surfaces of the lower wide portion 367, the central depressed portion 365, and the upper wide portion 366 may continuously form the inner surface of the fastener retention feature 360. As such, the configuration of the fastener retention feature 360 may be molded around a portion of the rigid limiter 330. Further, the stepped portion 345 may help ensure secure placement of the fastener retention feature 360, thereby supplementing chemical adherence of the fastener retention feature 360 to the rigid limiter 330. Thus, following assembly of the fastener retention apparatus 320, it may be difficult to remove the fastener retention feature 360, the fastener retention feature 360 being adhered and fit to the rigid limiter 330.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring now to FIG. 6, an example method 600 is shown for production, assembly, and placement of a first engine component of an engine assembly and a second engine component of the engine assembly. In one embodiment, the first engine component is an engine oil pan of an engine assembly and the second engine component is an engine block (such as engine oil pan 110 and engine block 101, as shown in FIGS. 1-2). Some portions of method 600 may occur at a first assembly location 610 and some portions of method 600 may occur at a second assembly location 630, where the first assembly location 610 is separated from the second assembly location 630 (by a distance requiring shipping of a component from the first assembly location 610 to the second assembly location 630).

At 612 of method 600, the method includes installing a plurality of fastener retention apparatuses (such as fastener retention apparatus 120 shown in FIGS. 1-2 and/or fastener retention apparatus 320 shown in FIGS. 3-5) to a first engine component (e.g., an engine oil pan) at the first assembly location 610. A plurality of apertures may be located in a surface of the first engine component. Each of the plurality of fastener retention apparatuses may be identical and positioned within a corresponding aperture of the plurality of apertures. Thus, the method at 612 may include inserting each fastener retention apparatus into a corresponding aperture of the first engine component and holding the fastener retention apparatus firmly within the corresponding aperture such that each fastener retention apparatus may be affixed and securely installed to the first engine component (e.g., so that they may not be easily removed/fall out). In alternate examples of method 600, only one fastener retention apparatus is installed to the first engine component.

At 614 of method 600, the method includes inserting a fastener into each of the plurality of fastener retention apparatuses at the first assembly location 610. Each fastener retention apparatus may comprise a rigid limiter, the rigid limiter having one or more inner surfaces forming an interior passage extending from a head end of the rigid limiter to a tail end of the rigid limiter. The head end of the rigid limiter may further be adapted to receive a head of a given fastener. Each fastener retention apparatus may further comprise a compressible retention feature, the compressible retention feature being permanently fixed to the one or more inner surfaces of a given rigid limiter and further being located at the head end of said rigid limiter such that no portion of the compressible retention feature projects outward from said rigid limiter. Further, the compressible retention feature may be shaped such that a given fastener may be inserted and firmly held in an interior passage of the compressible retention feature, wherein said fastener may not be easily removed from the compressible retention feature and thereby may be considered captive.

The compressible retention feature may be composed of a compressible material having a modulus of elasticity in a range of 0.01 to 0.7. The compressible retention feature may provide limited (e.g., a small amount of) radial and/or axial movement relative to a corresponding rigid limiter, wherein the compressible retention feature may be permanently fixed to one or more inner surfaces of said rigid limiter, to a given captive fastener being firmly held in the interior passage of the compressible retention feature via compression of the compressible material comprising the compressible retention feature.

At 620 of method 600, the method includes shipping the first engine component having the captive fasteners from the first assembly location 610 to the second assembly location 630. In one example, shipping the first engine component may include boxing up the first component, including the captive fasteners, and shipping the boxed part to an alternate location, such as the second assembly location 630. During shipping, the box, and part, may be jostled and moved around frequently. Further during shipping, the first engine component may maintain each of the captive fasteners located within a corresponding fastener retention apparatus, such that a single piece is shipped, the single piece being comprised of each of the first engine component, the captive fasteners, and the fastener retention apparatuses, each of the fastener retention apparatuses holding a corresponding captive fastener in place during shipping.

At 632 of method 600, the method includes fastening the first engine component to the second engine component via the captive fasteners at the second assembly location 630. For example, a plurality of receiving apertures may be located in the second engine component for receiving the captive fasteners of the first engine component. In alternate examples of method 600, only one receiving aperture may be located in the second engine component. Thus, each of the captive fasteners may be inserted and fastened into a corresponding receiving aperture of the receiving apertures, thereby fastening the first engine component to the second engine component. Method 600 then ends.

In this way, a fastener retention apparatus comprising a rigid limiter and an integrated fastener retention feature may facilitate an assembly of an engine component. The fastener retention feature may be composed of a compressible material such that a fastener held captive by said fastener retention feature may be afforded limited (e.g., a small amount of) radial and/or axial play within the fastener retention apparatus. One technical effect of such compressibility may be the mitigation of warping and/or deformation of an engine component during assembly via a reduction in fastening resistance and/or stress relative to employing, for example, a more rigid fastener retention feature. Further, the limited radial and/or axial play of the captive fastener may overcome further warping and/or deformation due to misaligned apertures for placing and/or receiving said fasteners resulting from machining tolerances intrinsic to manufacture of engine components. Furthermore, a reduction in separated components present during an assembly step as a result of affixing one or more fastener retention apparatuses to an engine component may prevent the dropping and/or misplacing of a fastener during the course of said assembly step. Such a system may have the technical effect of increasing production speed and/or efficiency as compared to a system including an increased number of components.

An example of a fastener retention apparatus comprises a rigid limiter including an interior passage formed between a wider, head end and a narrower, tail end and an integrated fastener retention feature permanently fixed to an inner surface of the interior passage at the head end, the fastener retention feature comprising a compressible material, the fastener retention apparatus shaped to receive a fastener within the interior passage and through the fastener retention feature. A first example of the fastener retention apparatus further includes the head end of the limiter including a flange extending outward from a body of the limiter, around a circumference of the limiter, the interior passage formed within the body and flange. A second example of the fastener retention apparatus, optionally including the first example of the fastener retention apparatus, further includes the body extending between a lower surface of the flange and the tail end, an outer diameter of the body smaller than an outer diameter of the flange. A third example of the fastener retention apparatus, optionally including one or both of the first and second examples of the fastener retention apparatus, further includes an inner diameter of the body being smaller than the outer diameter of the body. A fourth example of the fastener retention apparatus, optionally including one or more of the first through third examples of the fastener retention apparatus, further includes the body including a plurality of ridges spaced apart from one another around a circumference of an outer surface of the body, each ridge of the plurality of ridges extending along a portion of a length of the body from a lower surface of the flange toward the tail end, the length being parallel to a central axis of the fastener retention apparatus. A fifth example of the fastener retention apparatus, optionally including one or more of the first through fourth examples of the fastener retention apparatus, further includes a distance between each adjacent ridge of the plurality of ridges being at least five times larger than a thickness, in a direction of the circumference, of each ridge. A sixth example of the fastener retention apparatus, optionally including one or more of the first through fifth examples of the fastener retention apparatus, further includes the interior passage being formed by an inner surface of the body and an inner surface of the flange, the inner surface of the flange having an inwardly projecting stepped portion with a first diameter, a remaining portion of the inner surface of the flange having a second diameter greater than the first diameter, and where a third diameter of the inner surface of the body is equal to the second diameter. A seventh example of the fastener retention apparatus, optionally including one or more of the first through sixth examples of the fastener retention apparatus, further includes the fastener retention feature being annular with an outer surface including a central depressed portion adapted to have face-sharing contact with the stepped portion of the flange and wider portion, on either side of the central depressed portion, adapted to have face-sharing contact with the inner surface of the body and the remaining portion of the inner surface of the flange. An eighth example of the fastener retention apparatus, optionally including one or more of the first through seventh examples of the fastener retention apparatus, further includes an outer diameter of the wider portion of the fastener retention feature being equal to the second diameter and third diameter and wherein an outer diameter of the central depressed portion of the fastener retention feature is equal to the first diameter. A ninth example of the fastener retention apparatus, optionally including one or more of the first through eighth examples of the fastener retention apparatus, further includes an inner diameter of the fastener retention feature being smaller than the first diameter. A tenth example of the fastener retention apparatus, optionally including one or more of the first through ninth examples of the fastener retention apparatus, further includes the fastener retention feature extending inside the limiter, from the head end toward the tail end, along only a portion of a length of the limiter, the length arranged in a direction of a central axis of the fastener retention apparatus, the portion of the length being at least four times smaller than the length of the limiter. An eleventh example of the fastener retention apparatus, optionally including one or more of the first through tenth examples of the fastener retention apparatus, further includes the fastener retention feature and limiter being formed as one piece through chemical bonding of the fastener retention feature with the limiter.

An example of an assembly component for an engine comprises a first component including a surface including a plurality of apertures, a plurality of fastener retention apparatuses, each of the plurality of fastener retention apparatuses being identical and positioned within one corresponding aperture of the plurality of apertures, each of the plurality of fastener retention apparatuses comprising a rigid limiter including a head end and body, the body fit within the corresponding aperture and the head end including a flange in face-sharing contact with the surface and a compressible retention feature integrated with an inner surface of the rigid limiter, the compressible retention feature comprising a compressible material, and a plurality of fasteners, each fastener being identical and positioned within one corresponding fastener retention apparatus of the plurality of fastener retention apparatuses. A first example of the assembly component further includes each fastener being positioned within an interior passage of one of the plurality of fastener retention apparatuses, the interior passage formed by the inner surface of the limiter and an inner surface of the compressible retention feature. A second example of the assembly component, optionally including the first example of the assembly component, further includes the compressible retention feature being integrated with the inner surface of the rigid limiter, proximate to the head end, and extends between the flange and a portion of the body arranged adjacent to the flange. A third example of the assembly component, optionally including one or both of the first and second examples of the assembly component, further includes the compressible material of the compressible retention feature having a modulus of elasticity in a range of 0.01 to 0.7.

An example of a production method comprises installing a plurality of fastener retention apparatuses within a plurality of apertures of a first engine component, inserting a plurality of fasteners into the plurality of fastener retention apparatuses, where each fastener is inserted through an interior passage of one of the plurality of fastener retention apparatuses, the interior passage formed by inner surfaces of a rigid limiter and a compressible retention feature integrally formed within the rigid limiter, shipping the first engine component, with the installed fastener retention apparatuses and fasteners, from a first assembly location to a second assembly location while maintaining each fastener within a corresponding fastener retention apparatus, and at the second assembly location, fastening the first engine component to a second engine component via the fasteners. A first example of the production method further includes the fastening of the first engine component to the second engine component including allowing a limited amount of radial and axial movement of each fastener relative to the rigid limiter of the corresponding fastener retention apparatus via compression of the compressible retention feature while inserting each fastener within a corresponding receiving aperture in the second engine component. A second example of the production method, optionally including the first example of the production method, further includes the compressible retention feature being integrally formed with the rigid limiter at a head end of the rigid limiter, the head end adapted to receive a head of the fastener. A third example of the production method, optionally including one or both of the first and second examples of the production method, further includes each fastener retention apparatus being identical to every other fastener retention apparatus of the plurality of fastener retention apparatuses.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener retention apparatus, comprising:
   a rigid limiter including an interior passage formed between a wider, head end and a narrower, tail end and an integrated fastener retention feature permanently fixed to an inner surface of the interior passage at the head end, the fastener retention feature comprising a compressible material, the fastener retention apparatus shaped to receive a fastener within the interior passage and through the fastener retention feature,
   wherein the head end of the limiter includes a flange extending outward from a body of the limiter, around a circumference of the limiter, the interior passage formed within the body and flange, and wherein the interior passage is formed by an inner surface of the body and an inner surface of the flange, the inner surface of the flange having an inwardly projecting stepped portion with a first diameter, a remaining portion of the inner surface of the flange having a second diameter greater than the first diameter, and wherein a third diameter of the inner surface of the body is equal to the second diameter.

2. The apparatus of claim 1, wherein the body extends between a lower surface of the flange and the tail end, an outer diameter of the body smaller than an outer diameter of the flange.

3. The apparatus of claim 2, wherein an inner diameter of the body is smaller than the outer diameter of the body.

4. The apparatus of claim 1, wherein the body includes a plurality of ridges spaced apart from one another around a circumference of an outer surface of the body, each ridge of the plurality of ridges extending along a portion of a length of the body from a lower surface of the flange toward the tail end, the length being parallel to a central axis of the fastener retention apparatus.

5. The apparatus of claim 4, wherein a distance between each adjacent ridge of the plurality of ridges is at least five times larger than a thickness, in a direction of the circumference, of each ridge.

6. The apparatus of claim 1, wherein the fastener retention feature is annular with an outer surface including a central depressed portion adapted to have face-sharing contact with the stepped portion of the flange and wider portion, on either side of the central depressed portion, adapted to have face-sharing contact with the inner surface of the body and the remaining portion of the inner surface of the flange.

7. The apparatus of claim 6, wherein an outer diameter of the wider portion of the fastener retention feature is equal to the second diameter and third diameter and wherein an outer diameter of the central depressed portion of the fastener retention feature is equal to the first diameter.

8. The apparatus of claim 6, wherein an inner diameter of the fastener retention feature is smaller than the first diameter.

9. The apparatus of claim 1, wherein the fastener retention feature extends inside the limiter, from the head end toward the tail end, along only a portion of a length of the limiter, the length arranged in a direction of a central axis of the fastener retention apparatus, the portion of the length being at least four times smaller than the length of the limiter.

10. The apparatus of claim 1, wherein the fastener retention feature and limiter are formed as one piece through chemical bonding of the fastener retention feature with the limiter.

11. An assembly component for an engine, comprising:
    a component including a surface including a plurality of apertures;
    a plurality of fastener retention apparatuses, each of the plurality of fastener retention apparatuses being identical and positioned within one corresponding aperture of the plurality of apertures, each of the plurality of fastener retention apparatuses comprising:
       a rigid limiter including a head end and body, the body fit within the corresponding aperture and the head end including a flange in face-sharing contact with the surface; and
       a compressible retention feature integrated with an inner surface of the rigid limiter, the compressible retention feature comprising a compressible material; and
    a plurality of fasteners, each fastener being identical and positioned within one corresponding fastener retention apparatus of the plurality of fastener retention apparatuses,
    wherein the flange of the rigid limiter extends around a circumference of the rigid limiter, and wherein an interior passage is formed by an inner surface of the body and an inner surface of the flange, the inner surface of the flange having an inwardly projecting stepped portion with a first diameter, a remaining portion of the inner surface of the flange having a second diameter greater than the first diameter.

12. The assembly component of claim 11, wherein each fastener is positioned within the interior passage of one of the plurality of fastener retention apparatuses.

13. The assembly component of claim 11, wherein the compressible retention feature is integrated with the inner surface of the rigid limiter, proximate to the head end, and extends between the flange and a portion of the body arranged adjacent to the flange.

14. The assembly component of claim 11, wherein the compressible material of the compressible retention feature has a modulus of elasticity in a range of 0.01 to 0.7.

15. A production method, comprising:
  installing a plurality of fastener retention apparatuses within a plurality of apertures of a first engine component;
  inserting a plurality of fasteners into the plurality of fastener retention apparatuses, where each fastener is inserted through an interior passage of one of the plurality of fastener retention apparatuses, the interior passage formed by inner surfaces of a rigid limiter and a compressible retention feature integrally formed within the rigid limiter, wherein the compressible retention feature is flush with an outward-facing surface of the rigid limiter, and the interior passage having an inwardly projecting stepped portion near the outward-facing surface of the rigid limiter, the inwardly projecting stepped portion having a diameter smaller than a remaining portion of the interior passage;
  shipping the first engine component, with the installed fastener retention apparatuses and fasteners, from a first assembly location to a second assembly location while maintaining each fastener within a corresponding fastener retention apparatus; and
  at the second assembly location, fastening the first engine component to a second engine component via the fasteners.

16. The method of claim 15, wherein fastening the first engine component to the second engine component includes allowing a limited amount of radial and axial movement of each fastener relative to the rigid limiter of the corresponding fastener retention apparatus via compression of the compressible retention feature while inserting each fastener within a corresponding receiving aperture in the second engine component.

17. The method of claim 15, wherein the compressible retention feature is integrally formed with the rigid limiter at a head end of the rigid limiter, the head end adapted to receive a head of the fastener.

18. The method of claim 15, wherein each fastener retention apparatus is identical to every other fastener retention apparatus of the plurality of fastener retention apparatuses.

* * * * *